March 31, 1925.　　　　　　　　　　　　　　　1,531,341
E. H. LICHTENBERG
CLUTCH
Filed May 29, 1923　　　　2 Sheets-Sheet 1
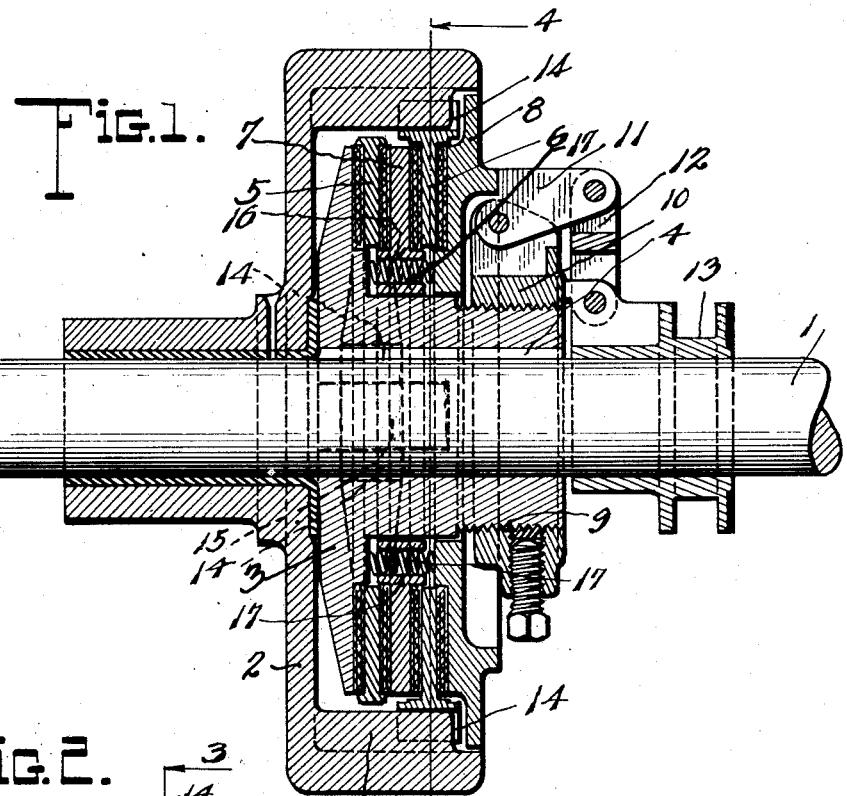
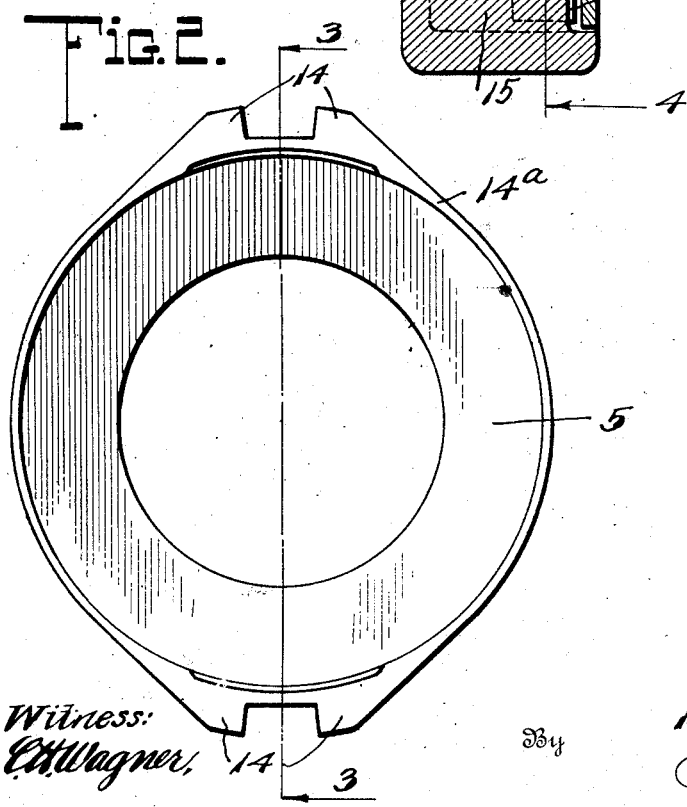
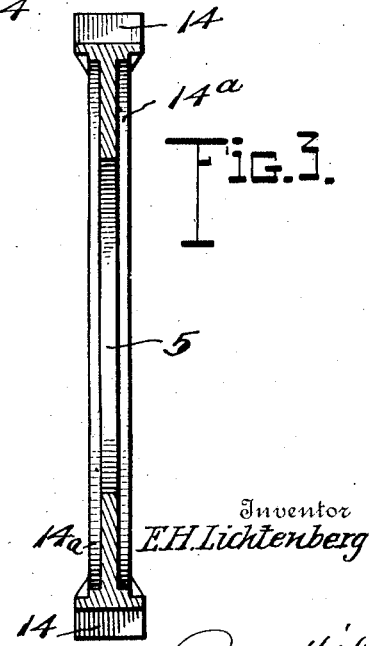
Inventor
E. H. Lichtenberg March 31, 1925.  1,531,341
E. H. LICHTENBERG
CLUTCH
Filed May 29, 1923  2 Sheets-Sheet 2

Witness:
C. H. Wagner

Inventor
E. H. Lichtenberg
By Robb, Robb & Hill
Attorneys

Patented Mar. 31, 1925.

1,531,341

UNITED STATES PATENT OFFICE.

ERICH H. LICHTENBERG, OF MILWAUKEE, WISCONSIN, ASSIGNOR TO KOEHRING COMPANY, OF MILWAUKEE, WISCONSIN, A CORPORATION.

CLUTCH.

Application filed May 29, 1923. Serial No. 642,290.

*To all whom it may concern:*

Be it known that I, ERICH H. LICHTENBERG, a citizen of the United States, residing at Milwaukee, in the county of Milwaukee and State of Wisconsin, have invented certain new and useful Improvements in Clutches, of which the following is a specification.

This invention embodies improvements in clutches of the friction disc or plate type.

The invention has to do particularly with a type of clutch wherein the driven discs or plates have an interlocking connection with a driven member, said driven discs being normally stationary but adapted to be clutched to a driving member or shaft by friction, and when so clutched to thereby transmit driving movement from the driving member to the driven member. Where driven discs or clutching plates of the interlocking type are used, it is known that when the load is received thereon by the action of clutching the discs to the driving member, a very considerable amount of wear takes place at the points where the discs interlock with the driven member. This wear necessitates replacement of the interlocking clutch plates or discs at intervals dependent upon the particular work which the clutch performs. Ordinarily there is no provision for the taking up of this wear.

Essential objects of the invention, therefore, are the design of my clutch whereby I use clutch plates having elements for interlocking with a driven member, which elements are provided with relatively large areas of contact with the interlocking portions, so as to reduce to a minimum the amount of work incident to the shock of the interlocking elements of said clutch plates, and those of the driven member coming together; the provision of an arrangement of such driven clutch plates so that their elements which interlock with the driven member engage the latter at different points so as to afford in this way additional and greater bearing intermediate the plate and driven parts; and additional provisions by which a relative shifting of the driven clutch plates may be effected, so as to bring their interlocking elements or bearing lugs into engagement with new or fresh portions of the co-operating lugs or bearing elements of the driven member, and in this way bring into co-operation fresh bearing surfaces between the plate and driven parts, doing away with the play that is incident to a previous co-operation of these parts where they have worked together for a considerable period of time.

Still another object of the invention has been to so design the several driven clutch plates and driven member that the space which these parts take is not increased notwithstanding that I am using interlocking bearing members between them possessing greater areas of contact than heretofore, and therefore greater strength and wear reducing advantages. Still another purpose of the invention has been to provide a construction of driven clutch discs or plates and driven member, wherein the adjustment of the clutch plates relatively to the driven member, to bring into co-operation the fresh interlocking or contacting elements, can be very quickly and readily effected by simple operations of parts already known and used in the art.

With the foregoing and other objects in view, a full comprehension of the invention and its advantages will be had on reference to the following description in conjunction with the annexed drawings, in which:

Figure 1 is a sectional view of a clutch embodying the invention, with the several parts assembled.

Figure 2 is a view in elevation of one of the interlocking driven clutch plates or discs, two of which are employed for the purposes of the invention.

Figure 3 is a sectional view of the driven clutch plate of Fig. 2, the section being taken about on the line 3—3 of the latter figure.

Figure 4:
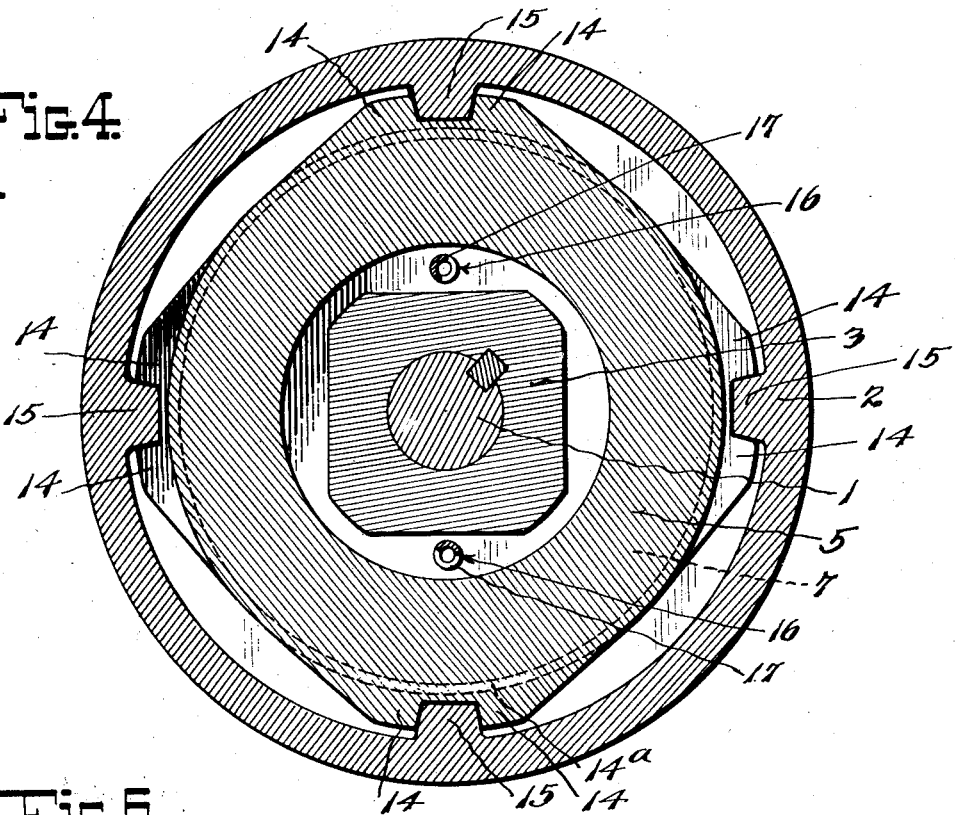
Figure 4 is a sectional view of the assembled clutch parts taken about on the line 4—4 of Fig. 1.
Figure 6:
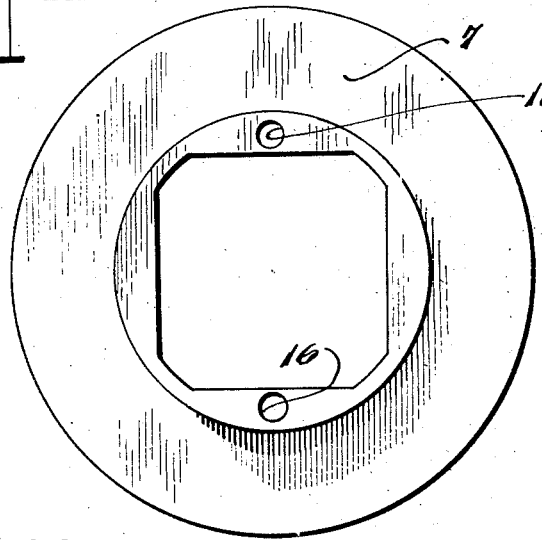
Figure 6 is a front view of said center clutch plate.
Figure 5:
Figure 5 is a sectional view of the center clutch plate.

Since in some general features my clutch is very similar to a certain type of friction clutch at present in use, the parts most commonly employed heretofore will be briefly set forth on reference to Fig. 1. The driving shaft is designated 1, and carries thereon loose therewith the driven member 2, which is in the form of a clutch housing in the present instance, tho it may take the form of a clutch housing gear, a housing with a cable winding drum, or several other forms that may be useful in the arts, dependent upon the particular purpose for which the clutch is designed. In other words, the driven member 2 may be formed with a spur gear, a bevel gear, or a winding drum, in an obvious manner, being characterized generally therefore as a driven member. On the driving shaft 1 is keyed the driving member 3 which takes the form of a master clutch plate or disc fixed to the shaft 1 by means of a key designated 4. Assembled on the master clutch plate 3, are driven friction discs or plates 5 and 6 which are of like form, shown best in Fig. 2, and between these two plates is a center friction plate 7, the several friction plates being held in place by a front or outermost friction plate 8. The hub portion of the master friction plate 3 is threaded, as shown at 9, to receive the adjusting ring 10, to which ring are pivoted the toggle links 11 which in turn are pivotally connected with the toggle yokes 12, the latter having pivotal connection with the spool or sleeve 13 that is usually engaged by a clutch yoke operated in the customary manner by a lever for shifting the clutch parts in the well known way. I do not illustrate the clutch yoke or its lever as the same are immaterial to the invention. The particular type of clutch shown is what is known as self locking when the spool or sleeve 13 is forced toward the master clutch plate so as to effect an application of the clutch, the clutch remaining in action until a reverse movement of the part 13 is completed either manually or automatically.

The inventive features of my invention reside in the construction of my parts 5, 6 and 7 primarily in conjunction with bearing lugs or interlocking elements on the driven member 2. The novel features will now be described.

Each of the driven clutch plates 5 and 6 may be characterized as an interlocking clutch plate, because it is equipped as seen in Fig. 2, with the opposite pairs of engaging lugs 14 which are adapted to engage with inwardly projecting lugs 15 on the driven clutch member or housing 2. The member 2 is equipped with 4 of the lugs 15, and said lugs are relatively long, extending almost the entire depth of the housing, as seen best in Fig. 1. Additionally it is notable on reference to Fig. 3, that the lugs 14 are relatively long being considerably longer than the thickness of the clutch plate by which they are carried. Another feature to be especially noticed is that the pairs of lugs 14 of the disc or plate 5 engage with the lugs 15 at diametrically opposite points in the driven member 2, and the corresponding lugs 14 of the plate 6 likewise engage with the lugs 15 of the member 2 at diametrically opposite points, but located at 90 degrees from the lugs 15 with which the lugs 14 of the plate 5 engage. Owing to this peculiar engagement of the lugs 14 of the plate 5 with different lugs 15 of the member 2, from those with which the lugs 14 of the plate 6 engage, I am able to use lugs 14 of greater length than the thickness of the plates 5 and 6, and still shift these plates as necessary to cause the frictional engagement of the parts 3, 5, 7, 6 and 8. If the lugs 14 of the plate 5 were exactly opposite those of the plate 6, the parts would interfere with one another. Furthermore, by the arrangement which I have referred to, it will be seen that I obtain between the plates 5 and 6 and the various lugs 15 of the driven member 2, a very considerable contacting area, advantageous from the viewpoint of strength, broad bearing surface, and reduction of wear, having in view the engaging action of the lugs 14 on the lugs 15 when the clutch is thrown in.

The co-operating sides of the several plates 3, 5, 7, 6 and 8 are supplied with suitable friction substances, such as "Raybestos" lining, or the like, and the center friction plate 7 is formed with openings 16 in which are mounted coiled springs 17, the normal action of which is to tend to separate the several clutch plates from frictional contact and permit the turning of the plates 3 and 8 when the clutch is inactive, at which time, of course, the driven member 2 is stationary.

After a continued period of use there may be some wear between the lugs 14 of the disc or plate 6 and the portions of the lugs 15 of the member 2 with which they engage. By unscrewing the adjusting ring 10 the front plate 8 may be detached, and the said plate 6 given a quarter turn to bring its lugs 14 into engagement with the other lugs 15 of the member 2. At the same time, the lugs 14 of the plate 5 will be correspondingly adjusted by a quarter turn of that plate after partial removal from the housing driven member 2, so that the plate 5 will be interlocked with those lugs 15 which were previously interlocked with the plate 6. Under these conditions fresh bearing portions between the plates 5 and 6 and the driven member 2 are brought into action, doing away with the play that previously might have been experienced owing to wear. When the lugs 14 of the plates 5 and 6 have been reengaged with different lugs of the member 2 from those previously engaged, the front plate 8 and adjusting ring 10 may be replaced in an obvious manner. The advantages of the foregoing arrangement and adjustment will be very obvious without further elucidation.

It will be understood that there may be conditions which will permit of removal of the plates 5 and 6 and their replacement one inside the other to engage their clutch lugs 14 with the same clutch lugs 15, but with different portions of the latter. Usually, however, there would be permitted, in the adjusting of the plates 5 and 6, sufficient outward movement that their lugs 14 may pass one another and be turned into engagement with new or fresh lugs 15 as previously outlined. The plates 5 and 6 are of like formation, and therefore may be applied so as to be used either as inner or outer plates, without difficulty. The lugs 14 are reinforced in their connection with the bodies of the plates 5 and 6 by extending webs 14ª cast integrally with the peripheries of the plates in an obvious manner on reference to Fig. 2.

The formation of the peripheral webs 14ª on the plates 5 and 6 is advantageous because the said webs overhang the "Raybestos" or other facing provided for the clutch plates mentioned, thus tending to hold the facing or lining substance in place.

Having thus described my invention, what I claim as new and desire to secure by Letters Patent, is:

1. In a clutch, a driven member provided with a plurality of relatively long clutch lugs, a plurality of driven clutch plates having clutch lugs, the lugs of each clutch plate engaging certain ones of the clutch lugs of the driven member, different from those that are engaged by the clutch lugs of other driven clutch plates, means for interchanging the engagement of the driven clutch plates with the said clutch lugs of the driven member to bring fresh bearing portions between said parts into action, and a driving clutch plate operatively associated with the driven clutch plates.

2. In a clutch, a driven clutch member comprising a driven clutch drum having relatively long clutch lugs, a plurality of driven clutch plates arranged within the drum and having clutch lugs, the lugs of each driven clutch plate engaging certain ones of the clutch lugs of the drum different from those that are engaged by the clutch lugs of other driven clutch plates, means whereby the driven clutch plates may be turned partial revolutions and reassembled in the drum to interchange the engagement of the clutch plate lugs with the clutch lugs of the drum to provide fresh bearing portions between the lugs, and a driving clutch plate operatively associated with the driven clutch plates.

3. In combination, a driven clutch member having relatively long clutch lugs, a driving clutch means including driven clutch plates each having a set of lugs to engage with the lugs of the driven member at certain points in the lengths of the latter, the clutch lugs of one driven clutch plate, however, engaging the clutch lugs of the driven member at different points from the points of engagement of the clutch lugs of the other driven clutch plate, means whereby the driven clutch plates may be turned partial revolutions to bring into bearing engagement fresh surfaces between the clutch lugs of the driven clutch member and those of the said driven clutch plates, a driving clutch plate intermediate said driven clutch plates, and means tending normally to separate the clutch plates.

4. In a clutch, a driven clutch member comprising a housing having internal lugs, driving clutch means including a master clutch plate within the housing, a front friction plate closing the housing, and clutch plates intermediate said master clutch plate and the front clutch plate, the clutch lugs of the driven member housing being relatively long, and each of said clutch plates being equipped with clutch lugs to engage certain ones of the clutch lugs of the driven member housing different from those that are engaged by the clutch lugs of the other clutch plate, and means for interchanging the engagement of the clutch plates with the said clutch lugs of the driven member housing to bring fresh bearing portions between said parts into action.

5. In a clutch, a driven clutch member comprising a housing having internal lugs, driving clutch means including a master clutch plate within the housing, a front friction plate closing the housing, and clutch plates intermediate said master clutch plate and the front clutch plate, the clutch lugs of the driven member housing being relatively long, and each of said clutch plates being equipped with clutch lugs to engage certain ones of the clutch lugs of the driven member housing different from those that are engaged by the clutch lugs of the other clutch plate, means for interchanging the engagement of the clutch plates with the said clutch lugs of the driven member housing to bring fresh bearing portions between said parts into action, and a center friction plate located intermediate the said clutch plates, with means tending to hold the clutch plates apart from the other plates between which they are arranged as well as the center clutch plate.

6. In a clutch, a driven clutch member comprising a housing having internal lugs, driving clutch means including a master clutch plate within the housing, a front friction plate closing the housing, and clutch plates intermediate said master clutch plate and the front clutch plate, the clutch lugs of the driven member housing being relatively long, and each of said clutch plates being equipped with clutch lugs to engage certain ones of the clutch lugs of the driven member housing different from those that are engaged by the clutch lugs of the other clutch plate, means for interchanging the engagement of the clutch plates with the said clutch lugs of the driven member housing to bring fresh bearing portions between said parts into action, and a center friction plate located intermediate the said driving clutch plates, with means tending to hold the clutch plates apart from the other plates between which they are arranged as well as the center clutch plate, the clutch lugs of the clutch plates being of greater length than the thickness of said plates and overlapping the center clutch plate, together with means permitting axial movement of the clutch plates to enable their interchanging adjustment previously mentioned.

In testimony whereof I affix my signature.

ERICH H. LICHTENBERG.